(12) United States Patent
Krishnan

(10) Patent No.: US 9,988,053 B2
(45) Date of Patent: Jun. 5, 2018

(54) SELF GOVERNED GEAR BOX

(71) Applicant: Muralee C. R. Krishnan, Kerala (IN)

(72) Inventor: Muralee C. R. Krishnan, Kerala (IN)

( * ) Notice: Subject to any disclaimer, the term of this patent is extended or adjusted under 35 U.S.C. 154(b) by 0 days. days.

(21) Appl. No.: 15/317,729

(22) PCT Filed: Jun. 16, 2015

(86) PCT No.: PCT/IN2015/000245
§ 371 (c)(1),
(2) Date: Dec. 9, 2016

(87) PCT Pub. No.: WO2015/193912
PCT Pub. Date: Dec. 23, 2015

(65) Prior Publication Data
US 2017/0106867 A1    Apr. 20, 2017

(30) Foreign Application Priority Data
Jun. 16, 2014  (IN) .......................... 2923/CHE/2014

(51) Int. Cl.
*B60W 30/18* (2012.01)
*B60W 30/188* (2012.01)
*F16H 3/72* (2006.01)
*F16H 37/08* (2006.01)
*B60W 10/08* (2006.01)
*B60W 10/105* (2012.01)

(52) U.S. Cl.
CPC .......... *B60W 30/188* (2013.01); *B60W 10/08* (2013.01); *B60W 10/105* (2013.01); *F16H 3/725* (2013.01); *F16H 37/0833* (2013.01);
*B60W 2510/081* (2013.01); *B60W 2710/1038* (2013.01); *F16H 2200/2015* (2013.01); *F16H 2200/2048* (2013.01)

(58) Field of Classification Search
CPC ............................ B60W 30/188; B60W 10/08
See application file for complete search history.

(56) References Cited

U.S. PATENT DOCUMENTS

2016/0311308 A1* 10/2016 Ziemer .................. B60K 6/365

* cited by examiner

*Primary Examiner* — Derek D Knight
(74) *Attorney, Agent, or Firm* — Porter, Wright, Morris & Arthur, LLP

(57) ABSTRACT

The present invention relates to a Self-Governed Gear Box (SGGB) functions as an automatic gear box system suitable for any power drive ranging from electrical to mechanical. This is an optimally-performed gear box system, in terms of power loss. The assembly is compact and simple with no additional elements other than gears. For the same reason, it is highly economical, easy to assemble and easy to maintain, with an expected ideal performance. Such a dynamic task of an automatic gear box system is achieved by implementing an algorithm enabling to sense the additional load applied at the input end, created by diverting a small quantity of power from the output end. This is in effect of inducing an engine disturbance as under-drive, under sub-optimum output rpm-torque conditions. As the engine disturbance introduced for sub-optimum output rpm-torque condition is a continuous governance mechanism, the input to output speed ratio assumed also will be continues in a designed range. The engine starts from zero speed when this gear box system is coupled between an engine and a load. Thus it is a continuously variable transmission system.

7 Claims, 4 Drawing Sheets

SELF GOVERNED GEAR BOX

FIELD OF THE INVENTION

The present disclosure relates generally to an automatic transmission system. More particularly, it relates to an automatic transmission system with high performance by implementing suitable algorithm successfully, without requiring any additional elements in addition to gears, pinions and other elementary parts like bearing, shafts etc.

BACKGROUND OF THE INVENTION

Vehicles need transmissions in order to provide a range of speed and torque outputs necessary for vehicular travel. The task of a vehicle transmission is to convert the traction force potential of a drive engine. An automatic gearbox is a type of motor vehicle transmission that frees the driver to shift gears manually, by automatically changing/assuming gear ratios as the vehicle moves. The automatic transmission systems/automatic gear boxes are tried increasingly in the vehicle industry as it gives more freedom for the driver and hence more human friendly. There are wide ranges of such systems in practice. They may be stepped transmission systems, continuously variable transmission systems or infinitely variable transmission systems in general.

The conventional automatic gear box may consist of the following elements including but are not limited to a) torque converter b) mechanical levers c) electronic actuators d) hydraulic parts e) electronic sensors/other circuitry, specially shaped elements in addition to gears. These gear box elements deteriorate the performance/cost effectiveness of the gear box and size/simplicity in its operation. Sophisticated automatic transmission systems available in the industry perform reasonably well, but are generally cumbersome in design. These transmission systems are having exorbitant cost compared to manual transmission systems. Further, these commercially available systems call for highly skilled personnel for its maintenance. Again, they are not free from many kinds of frictional losses.

A simple planetary gear train assembly has 1) sun gear 2) planet gears 3) ring gear and 4) Carrier connecting the planet gears. For a conventional use, one of its elements among 1) sun gear, 2) ring gear and 3) Carrier are locked with any one of these, and the entire assembly functions as a high-reduction gear box. But, interestingly, if all of these three elements are not locked (constrained) with any among them, there are three degrees of freedom for a planetary gear train system, one input (i/p), one output (o/p) and one intermediate drive (i/d). The simple gear and a planetary gear train without locking any of its elements together are somewhat analogous to a NP diode and a NPN/PNP transistor respectively.

U.S. Pat. No. 8,460,143 to George Sutherland entitled "Gear-based continuously variable transmission systems and methods thereof" relates to a continuously variable transmission system including a gear set having one or more sun gears, one or more planetary gears, and a planetary gear carrier arm on which the one or more planetary gears are mounted for rotational movement. The invention provides the continuously variable transmission functionality using only passive components (planetary gears, clutches and a torque converter).

U.S. Pat. No. 5,059,163 to John W. VON Greyerz entitled "Trans-planetary mechanical torque impeller" relates to trans-planetary mechanical torque impeller having various gear ratios with no gear case attachments. It provides a torque-type propulsion through a totally mechanical, self-governing, low to high gear, trans-planetary torque impeller capable of infinitely and automatically matching the input shaft or motor power output capability to the output shaft load.

The above mentioned prior art use a torque converter in combination with special mechanical/electronic/hydraulic gadgets/sensors. Such transmission systems are a compromise of economy and performance attributes and the losses are generally high in these cases.

U.S. Pat. No. 4,682,511 to Ernest C. Wittke entitled "Gear assisted continuously variable transmission" relates to a continuously variable transmission combined with a gear-shift mechanism to permit shifting of power flow under conditions of zero load and synchronous speed.

Japanese document 2013217434 to Shibata Naoyoshi entitled "continuously variable transmission" includes a differential device and synchronous torque transmission mechanism, relates to a continuously variable transmission of negative feedback by the torque disabled. The synchronous torque transmission mechanism and the transmission part are configured to work as a negative feedback mechanism such that an output torque load is fed back to always maintain input torque at a constant level.

Despite the foregoing, there is still a salient need for flexible and efficient automatic transmission system to overcome the above limitation.

Thus, the optimum design of the present invention overcomes the above mentioned problem since no elements in the gear box other than 'rotary gears that provide better performance. This is a no loss system, when the frictional losses between gears and at bearings are not considered as the output speed of the Gear Box is maximum, for the given power of the engine and the load to the Gear Box.

SUMMARY OF THE INVENTION

The main objective of the present invention is to provide a predominantly efficient automatic gearbox by implementing the elucidated algorithm successfully, without using any additional elements more than gears and other essentials like bearings, shafts, casing etc.

The present invention, the self-governed gear box (here after referred as SGGB) includes a network of five sets of planetary gear trains. An algorithm is implemented using the five sets of planetary gear trains. All of the five Planetary Gear Trains in the gearbox comprise of 1) sun gear 2) ring gear and 3) Carrier gear for each, which are not locked with any among them providing three leads, and for each, namely, one input (i/p), one output, (o/p) and one intermediate drive (i/d).

According to the present invention, whenever the speed-torque combination at the output of the gear box is not optimum for the power available in the system, the SGGB introduces an imbalance. Then the engine tries to negate the imbalance by increasing the output speed.

Hence, the output rpm of the mechanism always thrives to escalate till the maximum designed rpm is achieved for an engine power at the time. This goal is achieved by the implementation of the illustrated algorithm using the network of five sets of planetary gear trains.

The SGGB of the present invention is used for a) automobiles b) other mechanical power drives and c) electric motors for reducing starting current. The size of the automatic gear box is almost the same as that of the corresponding manual gear box. Cost of the proposed gear box is comparatively very low than conventional high performance automatic gear box.

The objectives and advantages of the present invention will become more evident from the following detailed description when taken in conjunction with the accompanying drawings.

BRIEF DESCRIPTION OF THE DRAWINGS

The objective of the present invention will now be described in more detail with reference to the accompanying drawings, in which.

REFERENCE NUMERALS

Ring wheel (r)
Star (carrier) wheel (c)
Sun wheel (s)
Pinion-gear reduction gears (Cx) & (a)
First planetary gear train (P1)
Second planetary gear train (P2)
Third planetary gear train (P3)
Forth planetary gear train (P4)
Fifth planetary gear train (P5)
Parameters of speed in rpm (x) & (y)

DETAILED DESCRIPTION OF THE INVENTION

Aspects of the present invention described herein, discloses the working principles of an automatic transmission system which provides better performance by implementing the algorithm explained. Similar algorithms are applicable to hydraulic motors or any other power drives favourably.

According to the present invention, the SGGB, gear inherently bypasses power from output, for effecting an additional load apart from that at the output of the gear box, to the engine, in a working output speed range. This additional load is designed as maximum for the minimum speed at the output, and minimum for the maximum speed at the output.

In accordance with the present invention, in the SGGB, a small portion of the power at the output i.e. $\Delta P$, is extracted and fed back to the input. This is achieved by providing a slight mismatch in the rpm of the input as well as the feedback end (when those ends are not connected each other). When the feedback end is connected to the input, in practice, there is a slight imbalance in the system while the same trying to equalise both the rpm (by compromising the engine speed and the speed of the other gears in the entire system). This imbalance is such that, it is effected to the engine as an additional load apart from the original load at output. The extracted power $\Delta P$ is converted to the additional load $\Delta L$. Lesser the output rpm, more the imbalance. The additional load is reduced if the output rpm escalates and reaches the maximum when picking up to the rated rpm. The nature of the imbalance is such that, the engine given an additional load (though in small amount). The engine tries to nullify this imbalance (the additional load) by increasing its output rpm. Hence, the SGGB provides maximum speed for a given power (the power in turn controlled by the accelerator of the engine).

Figure 1:
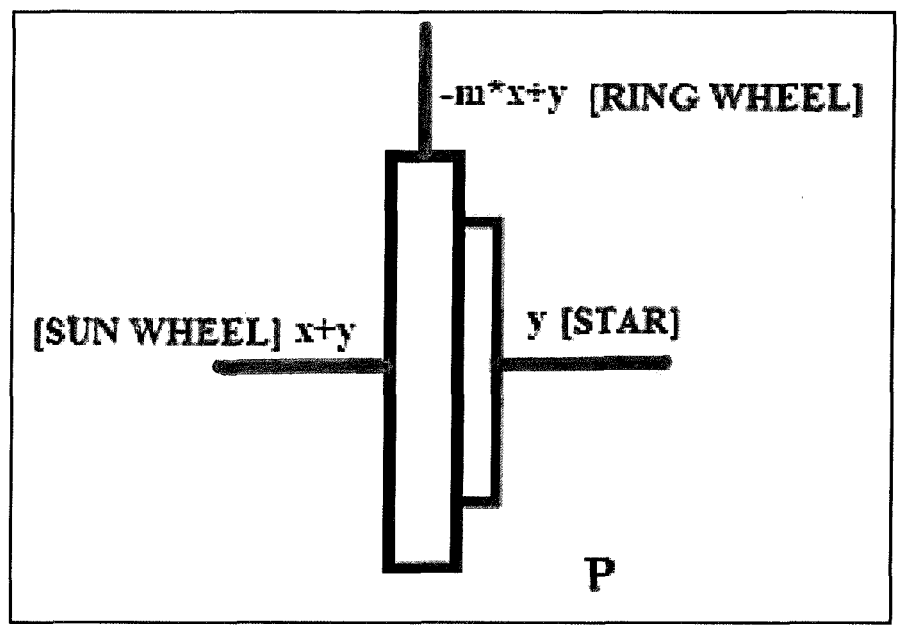
FIG. 1 shows a planetary gear system with three degrees of freedom.
Figure 3:
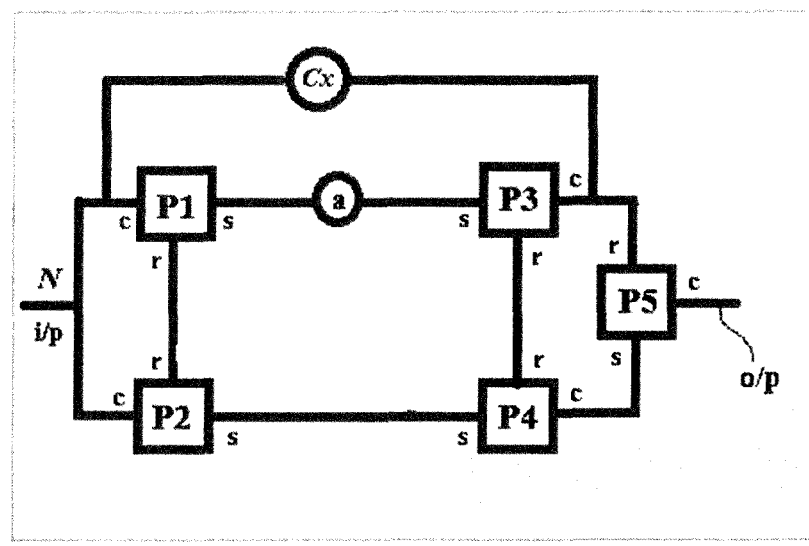
FIG. 3 shows all of the five planetary gear trains coupled together to form a full self-governed gear box.

Referring to FIG. 3, which shows five planetary gear trains and its connections. There are five sets of planetary gear trains named as P1, P2, P3, P4 and P5 in the SGGB, coupled together by shafts, gears and pinions. A planetary gear train is represented by a box with three leads as shown in FIGS. 1 and 3. Each lead represents either of the following.

a) Carrier wheel drive
b) Sun wheel drive
c) Ring wheel drive

The planetary gear train sets are connected as shown in FIG. 3. This connection diagram is one of the possibilities to implement the working principle explained in the above section. Its ring, carrier and sun wheels are represented by letters r, c and s respectively. P1, P3 and P2, P4 are identical couples. m and n are the ratio of the no of teeth of the sun wheels to the no of teeth of the ring wheel of these couplets. p is the ratio of the no of teeth of the sun wheels to the no of teeth of the ring wheel, of P5

Figure 2:
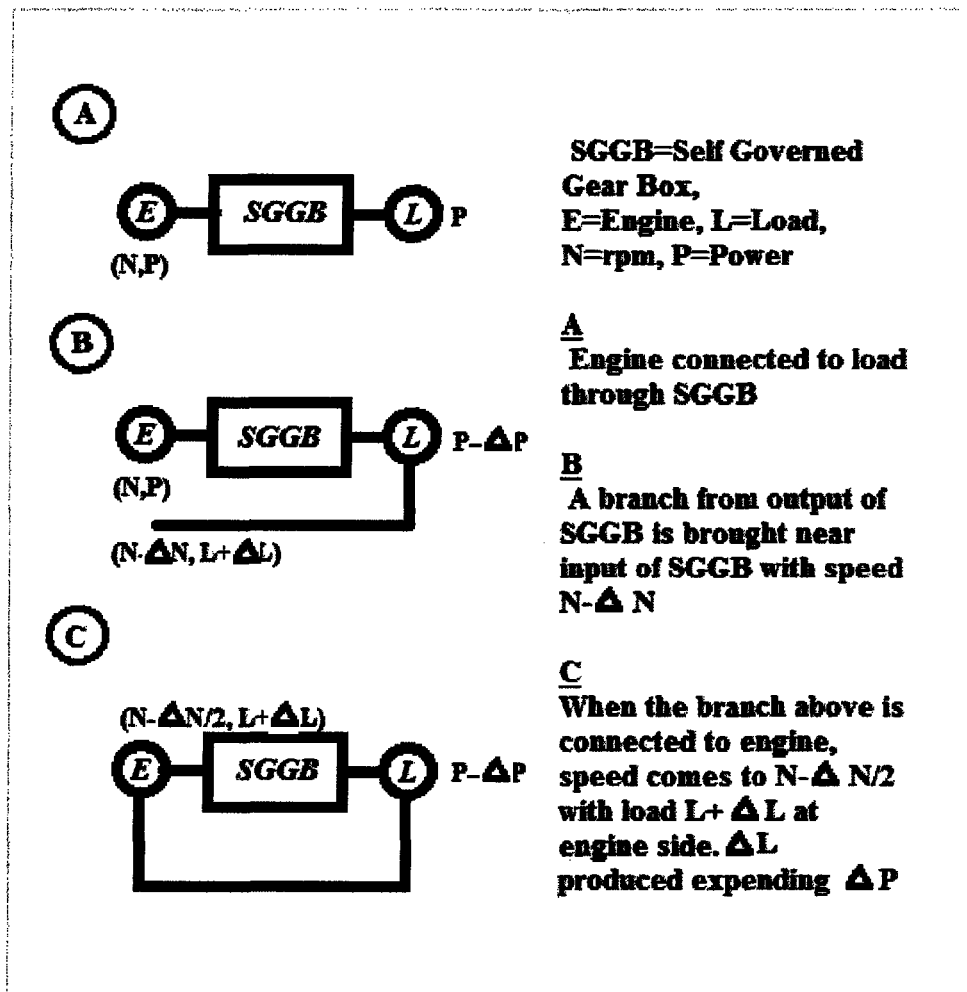
FIG. 2 illustrates the algorithm in steps.

Referring to FIG. 2 illustrates the algorithm in steps. Part A shows an Engine-Gear Box-Load circuitry. The speed at input (i/p) of the engine is N rpm, power of the engine is P and load at o/p is L.

Part B shows a feedback connection from o/p of the Gear Box. The speed at its end is N-$\Delta$N.

If the engine speed is initially N, and when the ends shown in PART B are connected in the gear box, under sub-optimum output conditions, the speed of the engine is forcibly reduced by $\Delta(N/2)$. This happens, when the output speed is not the maximum for a given power. The system tries to nullify the reduction of speed, for the engine to be free. As this is possible by increasing the output speed of the gear box, the system tries to increase its output speed.

In short, under sub optimum output conditions, an additional load $\Delta L$, expending a power $\Delta P$ from the o/p, is acting on the engine so that the speed of the engine is reduced by $\Delta N/2$. Power available at o/p is P-$\Delta P$ as shown in Part C. All the rpm of other gears are adjusted accordingly.

In Part D, when the maximum speed is attained for the given power at the o/p, $\Delta N=0$, $\Delta L=0$ and $\Delta P=0$. Full power, P is available at the o/p (of the gear box). Thus, this is a no loss system, when the frictional losses between gears and at bearings are not considered.

By regulating the maximum value of the magnitude of $\Delta(N/2)$, the pace of the gear box is set as fast acting or slow acting. If it is more, the speed at the output picks up faster and if it is smaller, speed at the output is picked up slowly.

In the preferred aspect of the present invention, FIG. 1 shows the epicycle gear trains' basic equations of speed. The epicyclic gear train has three linearly dependent speeds. Here, y is the rpm of the -carrier drive and 'm' is the ratio of number of teeth of the sun wheel to the number of teeth of the ring wheel. Then, x+y is the speed of sun wheel and -mx+y is the speed of the ring wheel, where x is another parameter and the unit is rpm.

In a brief description of the present invention, the system inherently response to cater the requirement of a typical automatic transmission system. This response is a result of the induced additional load to the engine side, in-addition to the load supplied externally, depending on the sub-optimal output condition. It is arranged such that the additional load sustains till optimum output condition is reached. For e.g. if present gear ratio is maximum, 'Smax', the additional load is K. If the gear ratio is Smax/2, the additional load is <K.

And finally, if the present gear ratio is Smin, which is the minimum gear ratio required from the system, the additional load K, is zero. The cases 1) minimum gear ratio 2) maximum gear ratio and methods for calculating different speeds of the gear box, satisfying the algorithm are explained below.

Referring again to the above figure, we get the following equations connecting
1. Sun wheel of P(1) to sun wheel of P(3)
2. Sun wheel of P(2) to sun wheel of P(4)
3. Ring wheel of P(1) to ring wheel of P(2)
4. Ring wheel of P(3) to ring wheel of P(4)
5. The carrier wheel of P(1) to the carrier wheel of P(3) through a reduction gear C.
6. The carrier wheel of P(3) to the ring wheel of P(5)
7. The sun wheel of P(5) to the carrier wheel of P(4)

For maximum gear ratio 1:4, minimum gear ratio 1:1.1 and input speed N=3500 rpm, solving the equations for these gear ratios, we get a=1.5 appr. Let the additional load imposes a speed reduction Δx at input end and this quantity be 300 rpm. Hence (N−300)/y4=3.66, where y4=output speed. Initially, 'N' be 3500 at constant power. When the output rpm is reduced to 3500/4, the input rpm is reduced to 3200 from 3500. This reduction is due to the additional load imposed to the engine (At that time, the effective gear ratio will be 3.66). The SGGB tries to negate the additional load and hence the speed reduction by 300, by means of increasing the output speed. When the gear ratio becomes 1:1.1, the input speed is restored to 3500. So, when the gear ratio is other than 1:1.1, the engine thrives to come back to its normal speed 3500. This is the required factor for an automatic gear box.

The self-governed gearbox can be used in automobiles, other mechanical power drives and electric motors (for reducing starting current). The size of the automatic gear box is almost the same as that of the corresponding manual gear box. Cost of the proposed gear box compared to conventional high performance automatic gear box is very low. The gear is operated at any desired performance level. For example it can be set for maximum fuel efficiency or for maximum acceleration. Once the gearbox is designed, its assembly is simple.

To examine the workability of the self governed gear box, a simulation of the working process was performed using Simulink, an add-on to Matlab. Simulink permits simulations of dynamic systems to be constructed by connecting functional process components and running the resulting simulated system.

Figure 4:
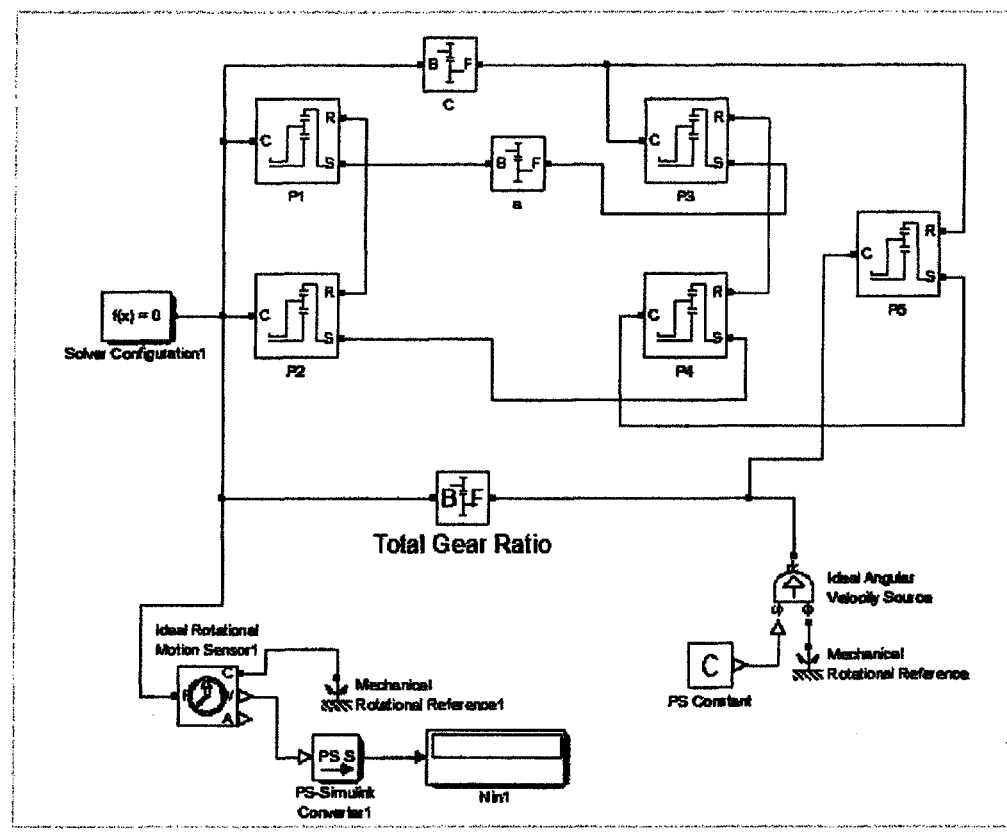
FIG. 4 shows schematic of self-governed gear box simulated in accordance with the present invention.

FIG. 4 shows a schematic of self-governed gear box simulated in accordance with the present invention. The illustrated model includes planetary gear block p1, p2, p3, p4 and p5 and each planetary gear block includes R port, C port and S port. R port of first planetary gear train P1 is connected to the R port of second planetary gear train P2, C port of planetary gear train P1 is connected to the C port of planetary gear train P2 and S port of planetary gear train P1 is connected to the S port of planetary gear train P3 via reduction gear 'a'. S port of planetary gear train P2 is connected to the S port of planetary gear train P4. C port of planetary gear train P3 is connected to the R port of the planetary gear train P5 and R port of the planetary gear train P3 is connected to the R port of the planetary gear train P4. C port of the planetary gear train P4 is connected to the S port of the planetary gear train P5. The C port of the planetary gear train P5 is connected to the output shaft. The Solver configuration block solves the functions in the system. The ideal angular velocity block that generates velocity connected to the output of the gear box. Further, the ideal angular velocity block get input physical signal from the PS constant block that is connected to the S port of ideal angular velocity Block. An ideal rotational block to sense angular velocity is connected to the input of the SGGB. The result is displayed at the output scope via PS-simulink converter. The Total gear ratio block is inserted just to give a gear ratio between input and output of the SGGB, for testing purposes. As the system is not supplied with torque anywhere, this block does not transmit torque to effect the performance of the SGGB. However, the behaviour of the SGGB as a power transmission system can be understood from this simulation.

It may be born in mind that the power is always conserved in the system. At greater loads, a small portion of the power is not available at output which is expended for creating an additional load of a small quantity at engine side. The scheme never denies any of the established scientific principles.

While the foregoing written description of the invention enables one of ordinary skill to make and use what is considered presently to be the best mode thereof those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The invention claimed is:

1. A Self Governed Gear Box (SGGB) to provide continuously variable speeds in a designed range comprising:
a first planetary gear train wherein said first planetary gear train includes a first sun wheel, a first ring wheel and a first carrier wheel;
a second planetary gear train wherein said second planetary gear train includes a second sun gear, a second ring wheel and a second carrier wheel;
a third planetary gear train wherein said third planetary gear train includes a third sun wheel, a third ring wheel and a third carrier wheel;
a fourth planetary gear train wherein said fourth planetary gear train includes a fourth sun wheel, a fourth ring wheel and a fourth carrier wheel;
a fifth planetary gear train wherein said fifth planetary gear train includes a fifth sun wheel, a fifth ring wheel and a fifth carrier wheel;
a first member wherein said first member integrally couples said first sun wheel and said third sun wheel through a reduction gear;
a second member wherein said second member integrally couples said second sun wheel and said fourth sun wheel;
a third member wherein said third member integrally couples said third carrier wheel and said fifth ring wheel;
a fourth member wherein said fourth member is integrally coupled with said fifth sun wheel and said fourth carrier wheel;
a fifth member wherein said fifth member is integrally coupled with said first ring wheel and said second ring wheel;
a sixth member wherein said sixth member is integrally coupled with said third ring wheel and said fourth ring wheel; and
a seventh member wherein said seventh member is integrally coupled with said first carrier wheel and said third carrier wheel through a speed reducer.

2. The Self Governed Gear Box (SGGB) according to claim 1, wherein said fifth carrier wheel of the fifth planetary gear train is connected to an output shaft.

3. The Self Governed Gear Box (SGGB) according to claim 1, wherein said first carrier wheel of said first planetary gear train and said second carrier wheel of said second planetary gear train are both connected to an input shaft.

4. A method to provide continuously variable speeds in a desired range with a Self Governed Gear Box (SGGB), said method comprises the steps of:
   (a) providing an automated transmission system including an algorithm, said automated transmission system comprising five sets of planetary gear trains connected together;
   (b) connecting said automated transmission system between an engine and a load;
   (c) extracting a small portion of power at an output of said load and feeding back the small portion of power as input into said engine;
   (d) providing an additional load which is less than said load if a rotational speed of said load is not optimum; and
   (e) nullifying the additional load by increasing the rotational speed of the output.

5. The method to provide continuously variable speeds in a desired range with a Self Governed Gear Box (SGGB) according to claim 4, wherein said automated transmission system is used with a power drive which delivers mechanical rotational energy.

6. The method to provide continuously variable speeds in a desired range with a Self Governed Gear Box (SGGB) according to claim 4, wherein said method is implemented in an automobile.

7. The method to provide continuously variable speeds in a desired range with a Self Governed Gear Box (SGGB) according to claim 4, wherein said automated transmission system receives mechanical rotational energy from an electric motor.

* * * * *